June 16, 1942.　　　C. B. BREEDLOVE　　　2,286,950
THEFT-PREVENTING DEVICE
Filed Feb. 2, 1942
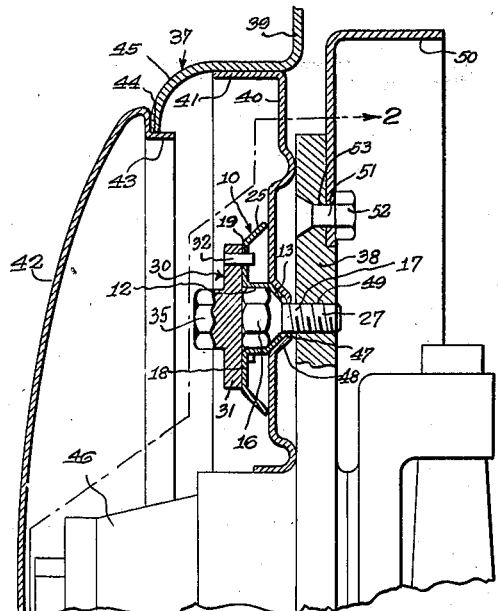

Patented June 16, 1942

2,286,950

UNITED STATES PATENT OFFICE 2,286,950

THEFT-PREVENTING DEVICE

Charles B. Breedlove, Detroit, Mich.

Application February 2, 1942, Serial No. 429,164

5 Claims. (Cl. 85—32)

This invention relates to theft-preventing devices and, in particular, to devices adapted to prevent the removal of bolts, nuts or screws.

One object of this invention is to provide a theft-preventing device consisting of a disc having a central recess for receiving and encircling the nut or the head of a screw so as to make it inaccessible to gripping by a wrench, special means being provided for applying the disc-like member.

Another object is to provide a theft-preventing device as set forth in the preceding object wherein the disc-like member is provided with irregularly spaced apertures adapted to be engaged by correspondingly located projections upon an applying tool, this tool optionally having a nut-like projection upon the opposite side thereof.

Another object is to provide a theft-preventing device as set forth in the preceding objects wherein the apertures and projections are of different diameters between themselves, so as to increase the number of combinations possible without duplication.

Another object is to provide a theft-preventing device as set forth in the preceding objects, wherein the disc-like member is provided with a cylindrical or a conical edge adapted to impede the gripping thereof by a pipe wrench or pliers.

Another object is to provide a theft-preventing device as set forth in the preceding objects wherein the disc-like member is in the form of a thin shell having a very light weight and hence incapable of throwing out of balance a vehicle wheel to which it is applied, as for the purpose of preventing theft of tires.

Another object is to provide a theft-preventing device as set forth in the preceding objects wherein the bottom of the central recess is bent inwardly so as to pass beneath the nut or the head of the screw to which it is applied, and wherein the device may be used in fitting either nuts or cap screws with either right-hand or left-hand threads such as are used on some types of automobiles.

In the drawing:

Figure 1 is a cross-section, partly in elevation, of a portion of a vehicle wheel and axle assembly having the theft-preventing device of this invention secured thereto;

Figure 2 is an enlarged front elevation of a portion of Figure 1, showing one of the theft-preventing devices of this invention in position around a stud or cap screw for securing a vehicle wheel to a brake drum flange;

Figure 3 is a front elevation of the theft-preventing device of Figure 2 when removed from the bolt, stud or nut to which it is intended to be applied;

Figure 4 is a cross-section along the line 4—4 in Figure 3;

Figure 5 is a side elevation of an applying tool for applying the theft-preventing device;

Figure 6 is a right-hand side elevation of Figure 5;

Figure 7 is a view similar to Figure 4, but showing the theft-preventing device attached to and encircling a nut on a threaded stem rather than on the head of a cap screw, as in Figure 1;

Figure 8 is a cross-section through a modification similar to Figure 4, but having a cylindrical edge rather than a conical edge.

In general, the theft-preventing device of the present invention consists of a disc-like member having a central recess corresponding in outline to the outline of the head of a cap screw or a nut. The portion surrounding this recess is provided with a plurality of irregularly spaced holes one or more of which may also be of different diameter from the others. The bottom of the recess is bent toward the axis in order to pass beneath the nut or screw head, whereas the outer rim of the device is preferably tapered to impede gripping by a wrench.

An applying tool (Figs. 5 and 6) is provided consisting of a disc having irregularly spaced pins on one side corresponding in location to the holes in the disc-like member of Figures 3 and 4. On the opposite side of the tool from the pins is a wrench-engaging portion, such as a hexagonal projection. As a consequence, the disc-like member of Figures 3 and 4 can be attached or detached only by a person possessing an applying tool with similarly located pins of corresponding diameters. The device is manufactured in large varieties as regards the location and diameters of the pins and holes, so that a thief would be unlikely to possess the correct adapter.

Referring to the drawing in detail, Figures 3 and 4 show the disc part 10 of the theft-preventing device as consisting of a body 11 having a central recess 12 of outline corresponding to the outline of the nut or screw head to be accommodated therein, and of a depth corresponding to the thickness thereof. Customarily, the recess 12 is of hexagonal cross-section. The bottom wall 13 of the recess 12 is bent inwardly from the side walls 14 thereof, so as to engage beneath the nut 15 (Fig. 7) or head 16 of the screw (Fig. 1) intended to be housed in the recess 12.

Surrounding the recess 12 is an annular portion 18 having three or more holes 19, 20 and 21 irregularly placed therein. These holes may be upon different diameters indicated by the dotted circles 22, 23 and 24 (Fig. 3) and one of them, such as 21, may be of larger diameter than the others. The outer rim of the disc-like member 10 is preferably provided with a tapered rim portion 25 (Fig. 4) for impeding the use of a pipe wrench or pliers. The bottom wall 13 is provided with an aperture 26 for the passage of the shank 27 (Fig. 1) of the screw 17 or for the threaded stud or stem 28 (Fig. 7) with which the nut 15 is to be employed. The rim 25 extends rearwardly and forms a skirt covering the side walls 14 of the central recess 12 so as to make them inaccessible to a wrench or pliers. The disc-like member 10 is preferably heat treated so as to render it tough and incapable of being pried off by a screw-driver, cold chisel, crowbar or the like.

To attach and detach the disc-like member 10 there is provided an attaching tool 30 (Figs. 5 and 6) consisting of a plate 31 having pins 32, 33 and 34 corresponding in location and size to the holes 19, 20 and 21 respectively. The pins 32, 33 and 34 may be formed integrally with the plate 31 or inserted in apertures therein. Projecting from the opposite side of the plate 31 is a wrench attachment portion 35, either integral with the plate 31 or secured in a corresponding recess or aperture therein.

The modification shown in Figure 8 is similar to that shown in Figure 4, with the exception that the rim 36 thereof is cylindrical in shape rather than conical. The rim 36, like the rim 25, however, serves as a skirt to conceal the side walls 14 of the central recess 12 and render them inaccessible to a wrench or other tool.

Figure 1 shows the device of the invention as applied in the attachment of a vehicle wheel 37 to a brake drum flange 38. The wheel 37 is provided with a rim portion 39, a central disc portion 40 attached thereto as by the flange 41, and a hub cap 42 having a flange 43 inserted in an aperture 44 of the forwardly extending portion 45. The hub cap 42 covers the hub 46 and conceals the central disc portion 40. The latter is provided with spaced apertures 47 having tapered side walls 48 adapted to receive cap screws 17 threaded into threaded apertures 49 in the brake drum flange 38. The brake drum 50 is secured to the brake drum flange 38 by the screws 51 and nuts 52, the former passing through apertures 53.

In the operation of the device, let it be assumed that the wheel 37 has been placed against the brake drum flange 38 with the apertures 47 in alignment with the apertures 49. Meanwhile, the shanks 27 of the cap screws 17 have been inserted through the apertures 26 in the central recesses 12 of the disc-like members 10, with the heads 16 resting in the recesses 12. This assembly is then placed against the wheel disc 40 with the shank 27 passing through the aperture 47 and threaded into the aperture 49.

The threading may be started by the fingers, but must be completed by means of the applying tool 30. The applying tool 30 is attached with its pins 32, 33, and 34 respectively engaging the holes 19, 20 and 21 (Fig. 1) after which a wrench may be applied to the portion 35 and the entire assembly screwed into its final position. When the device has been screwed tightly into position, the attaching tool 30 is removed, leaving the side walls of the screw head 16 completely concealed within the central recess 12 and inaccessible to a wrench. The removal of the wheel is accomplished by reversing the above procedure.

If the wheel 37 is attached to the brake drum flange 38 by means of nuts 15 upon threaded stems 28, the nuts 15 may be accommodated within the central recesses 12 in the same manner as the heads 16 of the cap screws 17. Accordingly, the device is adaptable equally to both nuts and cap screws, without the necessity of separate arrangements for these. The device is of light weight and hence will not throw a wheel out of balance. The conical edge portion 25 prevents engagement by a pipe wrench or pliers and also conceals the side walls 14 of the central recess 12.

The use of the modification of Figure 8 is similar to that of the principal form of the invention shown in Figure 4. The cylindrical rim 36 also serves to conceal the side walls 14 of the central recess 12.

While a specific embodiment of the invention has been described and illustrated, it will be understood that various modifications may be made within the scope of the appended claims without departing from the spirit of the invention.

What I claim is:

1. In a theft-preventing device, a disc-like member having a central recess shaped to receive a nut or screw head, a surrounding portion having irregularly spaced apertures, and an annular marginal portion extending rearwardly to form a skirt surrounding the side walls of said central recess.

2. In a theft-preventing device, a disc-like member having a central recess shaped to receive a nut or screw head and a surrounding portion having irregularly spaced apertures, the inner end portions of said central recess being bent inwardly to extend behind the nut or screw head.

3. In a theft-preventing device, a disc-like member having a central recess shaped to receive a nut or screw head and a surrounding portion having irregularly spaced apertures, said central recess being of polygonal cross-section.

4. In a theft-preventing device, a disc-like member having a central recess shaped to receive a nut or screw head and a surrounding portion having irregularly spaced apertures, said central recess being of hexagonal cross-section.

5. In a theft-preventing device, a disc-like member having a central recess shaped to receive a nut or screw head, a surrounding portion having irregularly spaced apertures, and a marginal skirt disposed outwardly of said surounding portion and extending rearwardly thereof, said marginal skirt being of tapered configuration.

CHARLES B. BREEDLOVE.